(12) United States Patent
Finkbeiner

(10) Patent No.: US 6,969,929 B2
(45) Date of Patent: Nov. 29, 2005

(54) COIL SYSTEM, A METHOD FOR THE PRODUCTION THEREOF AND AN ELECTRODYNAMIC DIRECT LINEAR DRIVE HAVING SAID COIL SYSTEM

(75) Inventor: Matthias Finkbeiner, Mötzingen (DE)

(73) Assignee: Festo AG & Co., Esslingen (DE)

( * ) Notice: Subject to any disclaimer, the term of this patent is extended or adjusted under 35 U.S.C. 154(b) by 142 days.

(21) Appl. No.: 10/663,332

(22) Filed: Sep. 16, 2003

(65) Prior Publication Data

US 2004/0075518 A1 Apr. 22, 2004

(30) Foreign Application Priority Data

Sep. 24, 2002 (DE) ................................. 102 44 261

(51) Int. Cl.[7] ............................................. H02K 41/02

(52) U.S. Cl. ..................... 310/12; 310/17; 310/DIG. 6; 318/135

(58) Field of Search ...................... 310/12, 15, DIG. 6, 310/71, 17, 19; 318/135

(56) References Cited

U.S. PATENT DOCUMENTS

| | | | | |
|---|---|---|---|---|
| 4,439,698 A | * | 3/1984 | Chen | 310/12 |
| 4,460,855 A | | 7/1984 | Kelly | 318/135 |
| 4,789,815 A | * | 12/1988 | Kobayashi et al. | 318/135 |
| 5,365,131 A | * | 11/1994 | Naito et al. | 310/12 |
| 6,008,552 A | * | 12/1999 | Yagoto et al. | 310/12 |
| 6,064,128 A | | 5/2000 | Yagoto et al. | 310/12 |
| 6,664,664 B2 | * | 12/2003 | Botos et al. | 310/12 |
| 6,787,944 B2 | * | 9/2004 | Finkbeiner et al. | 310/12 |
| 6,847,132 B2 | * | 1/2005 | Ukaji | 310/12 |

FOREIGN PATENT DOCUMENTS

| | | | | |
|---|---|---|---|---|
| DE | 197 09 044 A1 | | 11/1997 | ........ H02K 41/035 |
| DE | 19906638 | * | 8/2000 | ............ H02P 6/16 |
| JP | 58036162 A | * | 3/1983 | .......... H02K 41/03 |

* cited by examiner

*Primary Examiner*—Burton Mullins
(74) *Attorney, Agent, or Firm*—Hoffmann & Baron, LLP

(57) ABSTRACT

A coil system whose coil arrangement comprises a plurality of coaxially sequentially placed individual coil, whose wire ends are fixed on a board strip extending along the coil arrangement with a simultaneous making of contact with an electrical circuit formed thereon. Furthermore, a method for the manufacture of such a coil system and an electrodynamic linear drive fitted therewith are provided.

13 Claims, 3 Drawing Sheets

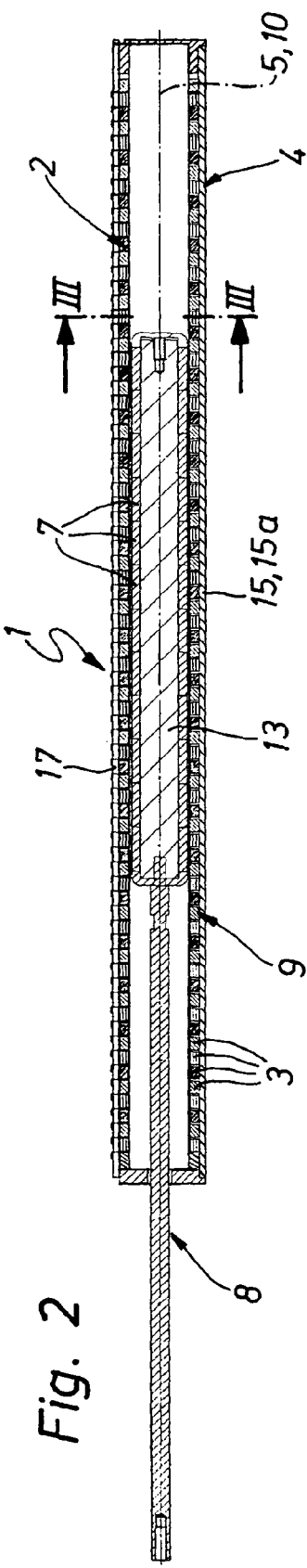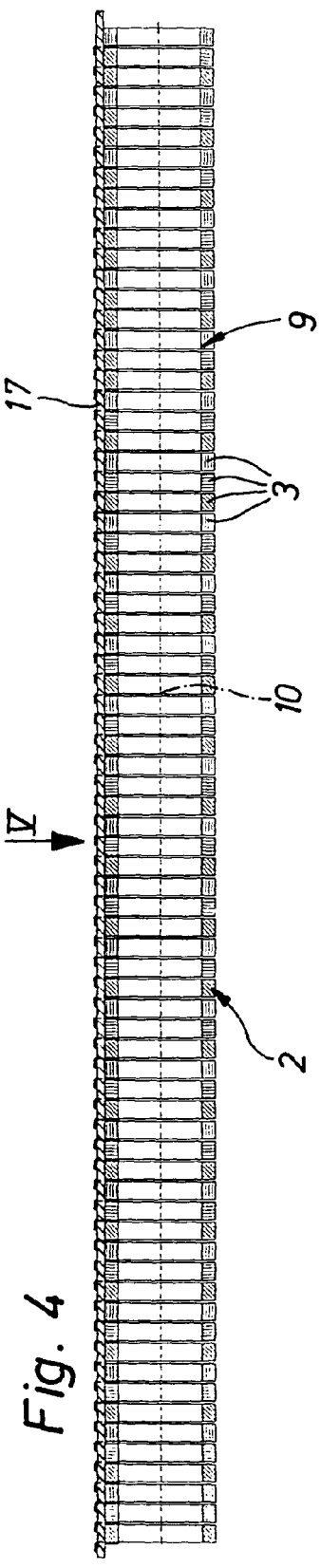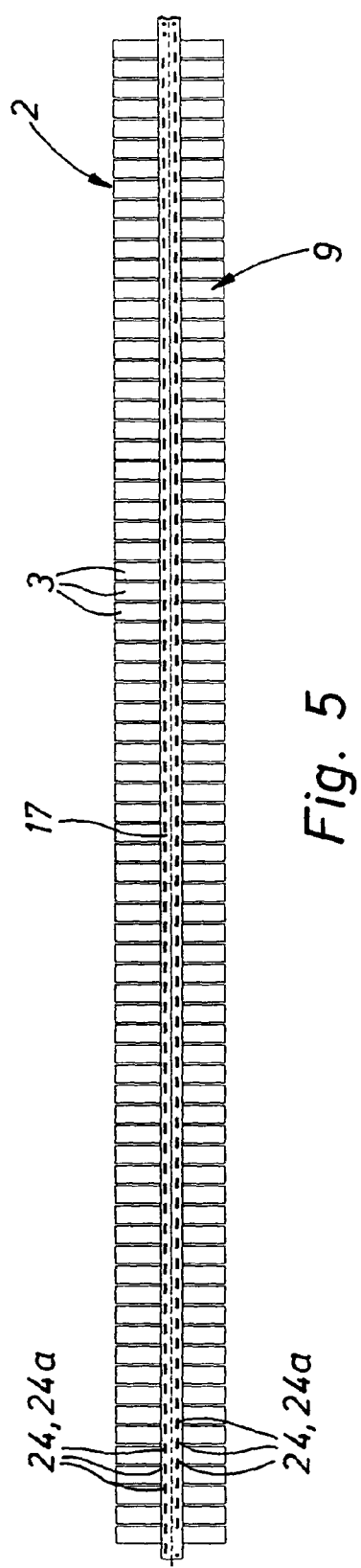

COIL SYSTEM, A METHOD FOR THE PRODUCTION THEREOF AND AN ELECTRODYNAMIC DIRECT LINEAR DRIVE HAVING SAID COIL SYSTEM

BACKGROUND OF THE INVENTION

The invention relates to a coil system adapted more especially for an electrodynamic direct linear drive, said coil system comprising a coil arrangement, which bears a plurality of individual coils placed with one another in a circuit and arranged coaxially in sequence. Furthermore the invention relates to a method suitable for the production of such a coil system. The invention also contemplates an electrodynamic direct linear drive with such a coil system.

THE PRIOR ART

Electrodynamic direct linear drives, which are as a rule termed linear motors, comprise a coil system able to be energized with a switched exciting voltage and a magnet system comprising one or more permanent magnets arranged in axial succession. One of these systems is a component of a stator while the other system is a component of an output drive part adapted to move in relation to the stator. Excitation of the coil system may cause a linear relative movement between the output drive part and the stator.

In the case of a direct linear drive disclosed in the U.S. Pat. No. 4,460,855 the individual coils of the coil arrangement are arranged together in groups, wherein the coils are formed within the individual coil groups by a continuous winding. The production of such continuous winding is relatively complex.

The German patent publication 19,709,044 A1 describes a linear motor whose stator coil comprises individual coils electrically connected one after the other in sequence. For commutation the conductor leads are extended outward and linked with a control circuit. Further details about the practical design of such a structure are however not provided in the said German patent publication 19,709,044 A1.

SHORT SUMMARY OF THE INVENTION

One object of the present invention is to provide a coil system rendering possible a high energy and power density, which may be simply produced. Furthermore, an electrodynamic direct linear drive is proposed fitted with such a coil system. In addition a particularly suitable method is suggested for the production of the coil system.

In order to achieve these and/or other objects appearing from the present specification, claims and drawings, the present invention provides a coil system, more especially for an electrodynamic direct linear drive, comprising a plurality of individual coils arranged coaxially in sequence and a board strip extending along the coil arrangement and having an electrical circuit with predetermined contact making points, with which the wire ends of each individual coil is contacted with simultaneous anchoring on the board strip.

The object of the invention is furthermore to be achieved by a method of production in which the prefabricated individual coils have their two wire ends so secured, and simultaneously contacted, on a board strip having an electrical circuit that the board strip extends along the coil arrangement.

In accordance with another form thereof the object of the invention is to be achieved by an electrodynamic direct linear drive comprising a first component designed in the form of a stator and a second component designed in the form of an output drive part and able to be linearly moved in relation to the stator, one of the components having a coil system with the above mentioned structure and the other component being fitted with a magnet system comprising one or more permanent magnets arranged axially in sequence, such magnet system being more particularly arranged coaxially to the coil system.

In the case of the coil system in accordance with the invention it is possible for the desired connection together in a circuit of the individual coils to be performed prior to their installation by producing suitable conductor links in any desired form on the board strip. Following this the wire ends of the individual coils merely have to be contacted at the predetermined contacting points of the circuit using the wire ends, there being simultaneously a fixation of the board strip in position. The result is then an assembly, within which the individual coils are fixed in position in a coaxial arrangement on the board strip extending along the coil arrangement and are simultaneously contacted. This assembly may then be simply installed at the site of use, as for example for the construction of an electrodynamic direct linear drive.

Since for producing this arrangement no winding body or core is necessary, on which the individual coils are wound, the individual coils may be placed extremely close together and even touch one another. It is in this manner that the air gaps are reduced to a minimum and it is possible to attain a high power and energy density.

The arrangement comprising board strip and individual coils mounted thereon may represent a self-supporting assembly.

It is preferred for the individual coils to be identical in structure. This means that on the basis of standardized individual parts very economic production is possible. The individual coils are preferably coils with bonding enamel.

At the points of contact the board strip preferably has contact making holes. In the longitudinal direction of the board strip sequentially placed pairs of contact holes are preferably provided, which are connected together by printed wiring on the board strip in a certain circuit pattern and in which the wire ends of the individual coils are inserted and soldered to the circuit.

The circuit may be so structured that the individual coils are connected together in circuit in a plurality of groups of coils. For instance, in this fashion two or three coil groups may be defined, the individual coils of the individual coil groups being arranged alternatingly on after the other. In the case of supply with a switched exciting voltage a travelling magnetic field is produced, which in conjunction with a linear drive may be employed for the production of the drive force.

The board strip is preferably located on the outer periphery of the coil arrangement, it preferably directly touching this outer periphery.

It is preferred to provide a magnetic return part coaxial to the coil arrangement, which possesses a longitudinally extending recess, in which the board strip extends. It is in this manner that the magnetic return part may be placed directly in the vicinity of the coil arrangement without obstruction by the board strip. The magnetic return part may for example be a tube surrounding the coil arrangement, which is longitudinally slotted to form the recess.

In order to strengthen the arrangement the intermediate spaces between the magnetic return part, the individual coils and the board strip are preferably filled with a potting composition. The above mentioned components are therefore secured in their relative positions.

For centering the individual coils may be mounted on an electrically non-conductive tube extending through coil arrangement. Preferably a plastic tube is utilized.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 2 shows a longitudinal section taken through the electrodynamic direct linear drive in accordance with FIG. 1 but omitting the guard tube placed around the coil arrangement.

FIG. 4 shows the coil system employed in the linear drive of FIGS. 1 through 3 in a longitudinal section omitting the magnetic return part.

FIG. 5 shows the arrangement of FIG. 4 in a side view looking in the direction of the arrow V.

DETAILED ACCOUNT OF WORKING EMBODIMENT OF THE INVENTION

Figure 1:
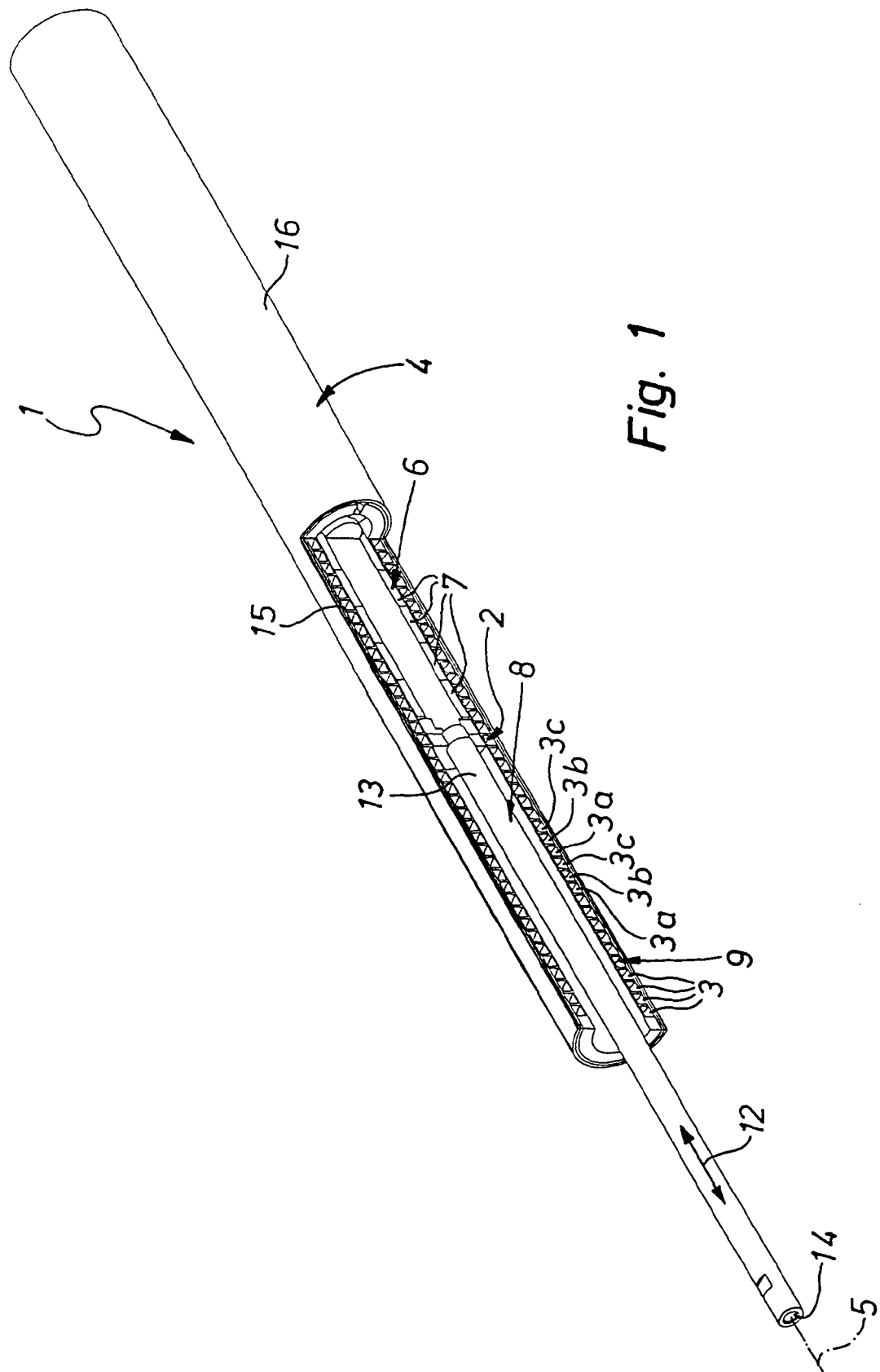
FIG. 1 shows a preferred design of an electrodynamic direct linear drive, which is fitted with a coil system produced using the method of the invention and fashioned to have features in accordance with the invention.
Figure 3:
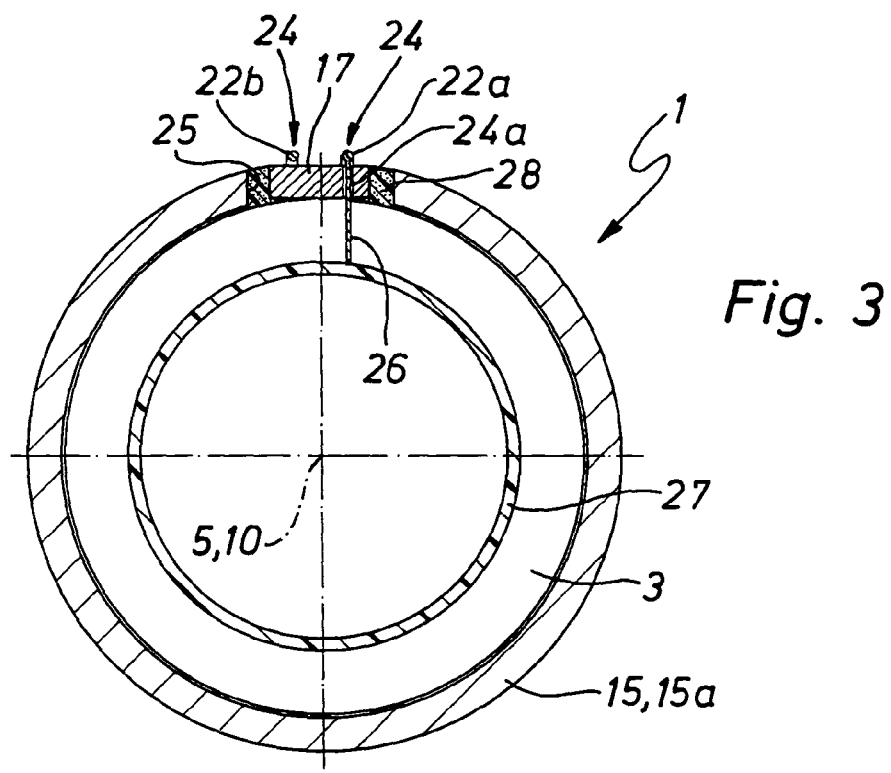
FIG. 3 is a cross section taken through the arrangement of FIG. 2 on the section line III—III.

The FIGS. 1 through 3 show an electrodynamic direct linear drive 1, which possesses a stator 4 of housing-like configuration and an output drive part 8 able to be moved linearly in relation to the stator 4. The longitudinal axis of the stator 4 is indicated at 5. The possible linear movement 12 of the output drive part 8 coinciding with the direction of the longitudinal axis 5 is indicated by a double arrow.

Figure 6:
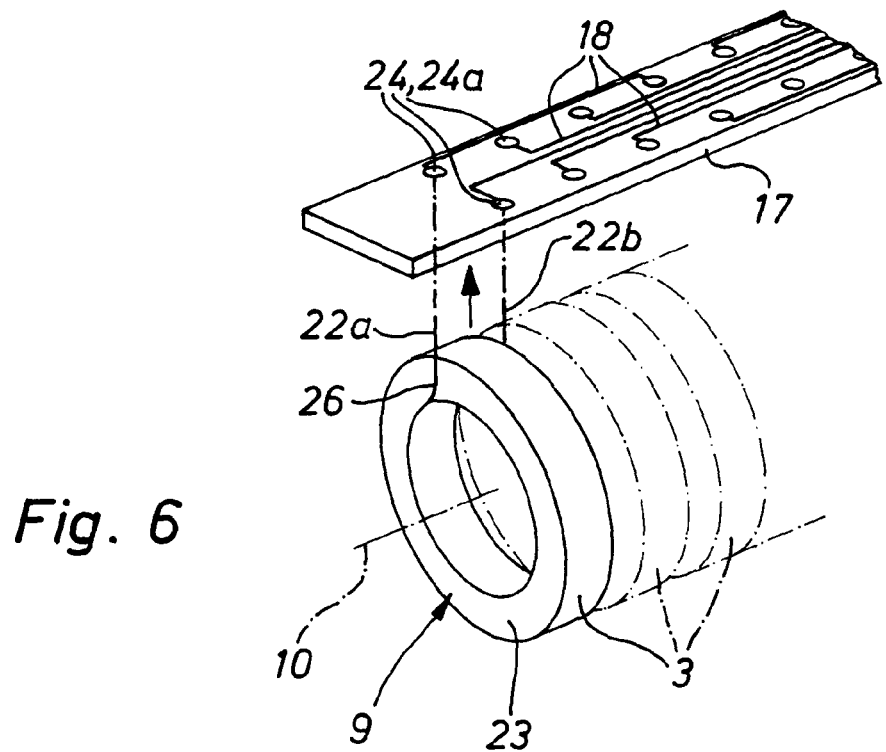
FIG. 6 is a view on an enlarged scale of the coil system in order to make clear the manner of attachment of the individual coils on the board strip.

The stator 4 is provided with a coil system 2, which comprises a plurality of individual coils 3 placed in coaxial sequence. The totality of the individual coils 3 so arranged is termed a coil arrangement 9. Its longitudinal axis 10 preferably coincides with the longitudinal axis 5 of the stator 4. The FIGS. 4 through 6 make clear the structure of the coil arrangement 9.

In a manner still to be described the individual coils 3 are electrically connected together in circuit to constitute a plurality of coil groups. In the working embodiment illustrated the connections in circuit provide for three coil groups. These coil groups could also be termed coil strands. Individual coils 3 within a coil group are connected in series The individual coils 3 of the different coil groups are so arranged that in the direction of the longitudinal axis 10 there is an alternating sequence or order. Following an individual coil 3a of the one coil group there is an individual coil 3b of the second coil group, which is followed by an individual coil 3c of the third coil group. This order is repeated. It would be possible to term the individual coil groups components of coil systems parts.

By means of control or drive means, not illustrated in detail, it is possible for the coil system 2 to be provided with switched exciting voltage, the different coil groups being excited or energized repeatedly at timed intervals electrically. It is in this manner that a travelling magnetic field is produced moving in the direction of the longitudinal axis 10 of the coil system 2.

The direct linear drive 1 is furthermore provided with a permanent magnet system 6. This system comprises one, or in accordance with the working example, a plurality of axially following permanent magnets 7 in sequence, which are preferably annular in structure. Preferably, there is a radial magnetization of the permanent magnets 7, directly adjacent permanent magnets 7 being oppositely magnetized.

The magnet system 6 is located in the interior space of the coil system 2 and is coaxially surrounded by the system. In this respect it is designed in the form of a component of the output drive part 8.

Departing from this configuration of a direct linear drive it would be possible as well to arrange the magnet system on the outer periphery of the coil system. Furthermore, the function of the stator 4 and the output drive part 8 could be exchanged.

The magnet system 6 is attached to a magnet support 13 constituting a magnetic return part, which in the working example is in the form of a bar and at one end projects from the tubular coil system 2. At the end it is provided with attachment means 14 for attachment of an object to be moved.

The coil system 2 is provided with a magnetic return part 15 as indicated in FIGS. 1 and 3 and which promotes return of the magnetic fields. It is placed on the side radially opposite to the magnet system of the coil arrangement 9 and is located on the outer periphery of the same in the working embodiment.

Preferably the magnetic return part 15, consisting of ferromagnetic material, is formed by a tubular body 15a, which coaxially surrounds the coil arrangement 9. The magnetic return part 15 and the coil arrangement 9 are fixed in relation to each other in the longitudinal direction.

The magnetic return part 15 may, as indicated in FIG. 1, be surrounded by a sleeve tube 16 or ferrule. Such tube practically constitutes the housing of the direct linear drive 1. It serves more particularly as a guard for the electrical and electronic components therein. If required it may serve for securing the stator 4 in position.

If the coil system 2 is supplied with a switched exciting voltage, the electromagnetic fields will cooperate with the permanent magnet fields of the magnet system 6 and cause a linear movement 12 of the magnet system 6 and accordingly of the output drive part 8 having same in relation to the coil system 2 and the stator 4 fitted with same. This linear movement may be utilized, for example, to move some object. Possibilities of application are inter alia in the automation technology sector in connection with manufacturing and assembly operations.

The direct linear drive is in a position to exert heavy drive forces. One of the reasons for this is the high energy density in the coil system 2. This is to be attributed to the minimum of air gaps, due inter alia to the fact that axially adjacent individual coils 3 are arranged without any gap or and or with only a small gap. Whereas conventional linear motors normally possess a coil system, in the case of which the coils are wound on a separate and usually plastic dimensionally stable coil body or core, in the case of the present direct linear drive such a coil body is dispensed with. Accordingly there is no partition, generally in the case of such cores, between adjacent coils.

The details of the coil system 2 will been seen particularly conveniently from FIGS. 3 through 6. In accordance therewith a board strip 17 extends on and along the outer periphery of the coil system 2, such board strip bearing an electrical circuit 18 indicated in FIG. 6 and composed of printed wiring. If required the electrical circuit may also comprise electronic components. The board strip 17 extends for the entire length of the coil arrangement 9, it conveniently resting on the outer periphery of the coil arrangement 9 and accordingly on the outer periphery of each individual coil 3.

The individual coils 3 are identical in structure and may be of a known type. Dependent on the electrical control it is possible to have such a provision that the different individual coils 3 partly have opposite directions of winding. Preferably however the direction of winding of the individual coils 3 is identical for all coils, flow of current in the opposite direction being possible by having a suitable circuit connection.

Each individual coil 3 comprises one wound coil wire, the winding being so selected that the two wire ends 22a and 22b (FIG. 6) are generally placed in the same peripheral region of the individual coil 3. They extend here generally radially outwardly and project past the actual coil body 23.

Contact making points 24 are provided on the board strip 17 which belong to the electrical circuit 18 and extend on the board strip 17 in the longitudinal direction. In the working embodiment the contact making points 24 are constituted by contact holes 24a, which extend through the board strip or body athwart its principal plane of extent. Their wall is preferably metallized.

The contact holes 24a are arranged in pairs, the two wire ends 22a and 22b of an individual coil 3 being inserted in each respective contact hole pair 24. By soldering the wire ends 22a and 22b are electrically contacted or connected with the circuit 18 and simultaneously mechanically secured to the board strip 17.

In order to obtain the association indicated of the individual coils 3 in different coil groups the contact points 24 or, respectively, contact holes 24a are connected together electrically in circuit by the printed wiring of the electrical circuit 18 with the required circuit pattern. It is clear that accordingly by the use of differently connected board strips 17 various different circuit functions may be produced with respect to the individual coil 3 without this having any effect on contact making and attachment of the individual coils 3 themselves. Therefore there is a high degree of flexibility in manufacture. Since irrespectively of the selected circuit design always the same sort of individual coils 3 is employed, there are substantial synergy effects owing to the possible multiple usage.

The individual coils 3 are preferably in the form of coils with bonding enamel.

For the design of the board strip 17 there are various different possibilities. For instance use may be made of a rigid board body so that the board strip 17 for its part is a rigid component. However, it may possess a multi-layer structure the electrical circuit 18 being produced on and/or between the individual layers (so-called multi-layer board). Furthermore the use of Rigid-Flex board is recommended, which preferably possesses a rigid component extending right along for the full length, on which contact is made with the individual coils 3, and which possesses at least one flexible wing extending in parallelism, which bears the principal components of the electrical circuit.

The board strip 17 is preferably so arranged on the outer periphery of the coil system 2 that its principal plane of extent runs tangentially to the outer periphery of the coil arrangement 9 (FIG. 3).

The tubular magnetic return part 15 placed on the outer periphery of the coil arrangement 9 has, at the board strip 17, a longitudinally extending recess 25 in which the board strip 17 runs. Preferably the recess 25 is constituted by a longitudinal slot in the tubular body 15a. The board strip 17 is received by the recess 25 so that the inner diameter of the tubular magnetic return part 15 may in other respects be so selected that the magnetic return part 15 lies directly on the outer periphery of the coil arrangement 9. This means that the air gaps are reduced to a minimum.

The distance apart between the directly adjacent individual coils 3 is limited to the diameter of the coil wire and is caused by the one wire section 26 running radially outward.

The intermediate spaces between the magnetic return part 15, the individual coils 3 and the board strip 17 are preferably filled with a potting composition 28, as for example a synthetic resin. Accordingly the above mentioned components are fixed in position in relation to one another.

To prevent ingress of the potting composition in the internal space in the coil arrangement 9, the individual coils 3 are preferably seated on an electrically non-conductive tube 27 extending coaxially through the coil arrangement 9. The tube 27 can also be employed for centering the individual coils 3. In conjunction with the direct linear drive it moreover constitutes the running face for the output drive part 8.

For the manufacture of the coil system 2 firstly a board strip 17 is prepared, which has the desired electrical circuit 18 with the corresponding contact making points 24 or, respectively, the contact holes 24a. The individual coils 3 have their wires end 22a and 22b inserted into the appropriate contact holes 24a and are soldered thereat to the circuit. In principle the individual coils 3 could be inserted one after other in sequence and respectively be soldered directly afterward. However a method is more rational in which the wire ends 22a and 22b of all individual coils 3 are firstly inserted into the board strip 17 and are then soldered in a joint soldering operation to the board strip 17.

The tube 27 may then be inserted in position for centering the individual coils 3.

After soldering the assembly consisting of the individual coils 3 and the board strip 17, which is best self-supporting, is inserted into the magnetic return part 15. Following this or even beforehand the tube 27 is introduced in the coil system 2. In a further step the intermediate space between the individual coils 3, the tube 27, the magnetic return part 15 and the board strip 17 (extending into the recess 25) are filled with the potting composition.

The coil system 2 so prepared may now be put to its intended use, for example for the construction of an electrodynamic direct linear drive of the type described.

What is claimed is:

1. A coil system adapted for an electrodynamic direct linear drive, the coil system comprising a coil arrangement, which bears a plurality of individual coils arranged coaxially in sequence, a board strip extending along the coil arrangement, such board strip having an electrical circuit with predetermined contact making points with which the wire ends of each individual coil are electrically and mechanically contacted on the board strip, and magnetic return part coaxial to the coil arrangement which possesses a longitudinally extending recess in which the board strip extends.

2. The coil system as set forth in claim 1, wherein the magnetic return part is a tubular body surrounding the coil arrangement, such body being longitudinally slotted to form the recess.

3. The coil system as set forth in claim 1, wherein the intermediate spaces between the magnetic return part, the individual coils and the board strip are filled with a potting composition.

4. The coil system as set forth in claim 1, wherein the individual coils are coils with bonding enamel.

5. The coil system as set forth in claim 1, wherein the individual coils are identical with each other.

6. The coil system as set forth in claim 1, wherein axially adjacent individual coils at least in part touch one another.

7. The coil system as set forth in claim 1, wherein the board strip is rigid or at least partly flexible in structure.

8. The coil system as set forth in claim 1, wherein the board strip possesses contact making holes arranged in sequence in the longitudinal direction of the board strip, which are placed in a circuit by printed wiring on the board strip in accordance with a predetermined circuit pattern and into which the wire ends of the individual coils are inserted and soldered to the electrical circuit.

9. The coil system as set forth in claim 1, wherein the circuit is so constituted that the individual coils are connected together in a plurality of coil groups.

10. The coil system as set forth in claim 1, wherein the board strip lies against an outer periphery of the coil arrangement.

11. An electrodynamic direct linear drive comprising a first component in the form of a stator and a second component in the form of an output drive part movable linearly in relation to the stator, one of the components being fitted with a coil system comprising a coil arrangement, which bears a plurality of individual coils arranged coaxially in sequence, a board strip extending along the coil arrangement, such board strip having an electrical circuit with predetermined contact making points with which the wire ends of each individual coil are electrically and mechanically contacted on the board strip, and a magnetic return part coaxial to the coil arrangement which possesses a longitudinally extending recess in which the board strip extends and the other component being fitted with a magnet system comprising one or more axially sequentially placed permanent magnets.

12. An electrodynamic direct linear drive as set forth in claim 11, wherein the magnet system and the coil system are placed coaxially one within the other.

13. A coil system adapted for an electrodynamic direct linear drive, the coil system comprising a coil arrangement, which bears a plurality of individual coils arranged coaxially in sequence and a board strip extending along the coil arrangement, such board strip having an electrical circuit with predetermined contact making points with which the wire ends of each individual coil are electrically and mechanically contacted on the board strip, and wherein the individual coils are centered on an electrically non-conductive tube extending through the coil arrangement.

* * * * *